United States Patent
Deutsch et al.

(10) Patent No.: US 6,856,736 B2
(45) Date of Patent: Feb. 15, 2005

(54) LIGHTWAVEGUIDE CABLE AND PROCESS FOR CARRYING AN OPTICAL SIGNAL USING DISPERSION MANAGEMENT

(75) Inventors: Bernhard A. M. Deutsch, Hickory, NC (US); Gunter Zeidler, Germering (DE)

(73) Assignee: CCS Technology, Inc., Wilmington, DE (US)

( * ) Notice: Subject to any disclaimer, the term of this patent is extended or adjusted under 35 U.S.C. 154(b) by 111 days.

(21) Appl. No.: 10/016,316

(22) Filed: Dec. 10, 2001

(65) Prior Publication Data

US 2004/0190840 A1 Sep. 30, 2004

(30) Foreign Application Priority Data

Dec. 12, 2000 (DE) .......................................... 100 61 836

(51) Int. Cl.⁷ ............................................... G02B 6/44
(52) U.S. Cl. ..................................... 385/100; 385/105
(58) Field of Search ................................ 385/100, 105, 385/127; 359/334

(56) References Cited

U.S. PATENT DOCUMENTS

| | | | | |
|---|---|---|---|---|
| 5,191,631 A | | 3/1993 | Rosenberg | ................... 385/123 |
| 5,611,016 A | | 3/1997 | Fangmann et al. | ......... 385/100 |
| 6,084,993 A | | 7/2000 | Mukasa | ........................ 385/24 |
| 6,470,126 B1 | * | 10/2002 | Mukasa | ....................... 385/123 |
| 2002/0114061 A1 | * | 8/2002 | Naito et al. | .................. 359/334 |
| 2003/0049005 A1 | * | 3/2003 | Mukasa | ....................... 385/127 |

FOREIGN PATENT DOCUMENTS

| | | | | |
|---|---|---|---|---|
| EP | 0469792 A2 | 2/1992 | ............. | H01S/3/06 |
| EP | 0790510 A2 | 8/1997 | ............ | G02B/6/16 |
| EP | 0877496 A2 | 11/1998 | ........... | H04B/10/18 |

OTHER PUBLICATIONS

S. Ten et al., "Viable Dispersion Management Scheme With Standard and NZDSF Fibers for 10Gb/s WDM Systems", ECOC '98, Sep. 20–24, 1998, pp. 179–180, Madrid Spain.

* cited by examiner

Primary Examiner—Chandrika Prasad

(57) ABSTRACT

An optical-waveguide cable which is distinguished by a dispersion that avoids non-linearities in conjunction with a relatively low attenuation comprises at least one first section (a), which has fibers of a first type (H) which are designed as high-level fiber, and at least one second section (b), which has fibers of a second type (N) which are designed as low-level fiber, the fibers of the first type (H) being connected to the fibers of the second type (N) at at least one transition point (U) between the first and second sections (a, b), and the fibers of the first type (H) having a larger mode field diameter and a higher dispersion than the fibers of the second type (N).

Furthermore, a method for transmitting optical signals is proposed, in which the optical signals to be transmitted are coupled into fibers of the first type (H) of a first section (a) of such an optical-waveguide cable and, after a specific transmission path, are fed into fibers of the second type (N) of a second section (b) of the optical-waveguide cable.

14 Claims, 2 Drawing Sheets

LIGHTWAVEGUIDE CABLE AND PROCESS FOR CARRYING AN OPTICAL SIGNAL USING DISPERSION MANAGEMENT

CROSS-REFERENCE TO RELATED APPLICATIONS

This application claims the benefit of priority under 35 U.S.C. § 119 of German Patent Application No. 100 61 836.7 filed on Dec. 12, 2000.

FIELD OF THE INVENTION

The invention relates to an optical-waveguide cable, in particular for transmitting optical signals according to wavelength division multiplex technology. The invention furthermore relates to a method for transmitting optical signals in which such an optical-waveguide cable is employed.

Optical waveguides are increasingly being employed for data transmission. The optical waveguides, generally comprising glass fiber or plastic, are largely insensitive to electromagnetic interference and, moreover, are distinguished by very high transmission rates of up to a number of gbit/s. An optical waveguide is constructed from a thin cylindrical fiber made of a highly transparent, dielectric material, such as, for instance, doped quartz glass ($SiO_2$), the so-called core glass, a cladding, the so-called cladding glass, surrounding the latter, and a generally single- or two-layer coating, the so-called primary coating, affording protection against mechanical influences. An optical-waveguide cable is composed of one or more optical waveguides which are encapsulated by a common cable sheath usually made of plastic, the so-called secondary coating, which additionally protects the optical waveguides against mechanical, thermal and chemical influences during laying and operation.

The data, generally present as electrical signal, are converted into an optical signal, that is to say a light beam having a specific wavelength, for transmission by means of an optical waveguide by an optical transmitter, for instance a laser diode. The light beam which is thus modulated with the data to be transmitted takes its course through the optical waveguide by undergoing total reflection at the boundary layer between core glass and cladding glass if the light is coupled into the optical waveguide below a specific angle, the angle of acceptance. The light beam also follows curves of the optical waveguide in this way. The reason for this is that the core glass and the cladding glass are produced from materials which have different optical densities. After the optical signal has been transmitted through the optical waveguide, it is converted into an electrical signal again for further processing.

The transmission of the optical signal by means of an optical waveguide is based on amplitude, frequency or phase modulation of a light beam having a specific wavelength. In order to better utilize the transmission capacity of an optical waveguide, so-called wavelength division multiplex technology (WDM) is employed, in which different wavelengths are modulated, in other words different wavelengths are utilized for parallel transmission of a plurality of signals. An optical coupling element, the so-called wavelength division multiplexer, concentrates the different wavelengths into a wavelength division multiplex signal, which is then transmitted via the optical waveguide to the reception location, where it is split into the individual optical signals again by means of a wavelength division demultiplexer, for example a filter. Wavelength division multiplex technology is suitable for both unidirectional and bidirectional operation and usually utilizes wavelengths in optical windows at 850 nm, 1300 nm and 1550 nm.

Optical waveguides can be subdivided into monomode fibers (single-mode fibers) and multimode fibers, depending on the type of guidance of a light beam in the core glass. In the case of monomode fibers, the diameter of the core glass is of the order of magnitude of the wavelength of the light, so that only a single mode, the so-called fundamental mode, can propagate in the core glass. However, the mode also radiates beyond the core glass into the cladding glass. Therefore, the mode field diameter serves for indicating the light distribution of a mode, the said mode field diameter specifying the level at which the field amplitude of the light beam has fallen to 1/e (approximately 37%) of its maximum value.

In the case of multimode fibers, by contrast, a plurality of discrete light waves, the modes differing primarily in terms of the field distribution and the propagation speed, contribute to the signal transmission. Depending on the type of configuration of the refractive index of the core glass, the multimode fibers can be subdivided into stepped-index fibers, in which the core glass and cladding glass have a constant refractive index, and graded-index fibers, in which the refractive index of the core glass decreases towards the outside. In the case of the stepped-index fibers, the light does not propagate parallel in the axial direction of the optical waveguide, but rather is reflected between the core glass and cladding glass. The consequence of this is that a zigzag movement is produced and the individual modes cover different path lengths. These propagation time differences of the modes result in a widening of the light pulse, the so-called mode dispersion, which, usually together with chromatic dispersion, restricts the bandwidth of the optical waveguide. In order to avoid this, a defined profile of the refractive index in the core glass is provided in the case of graded-index fibers, with the consequence that the light is diffracted in the core glass. In this way, instead of a zigzag course, the light propagating in the core glass exhibits a wavy movement, in the case of which longer path lengths are compensated by a higher propagation speed.

In addition to the bandwidth influenced by the dispersion, the transmission capacity of an optical waveguide is principally characterized by the wavelength-dependent attenuation, that is to say the energy loss of the light beam in the course of a transmission path on account of scattering and absorption. Therefore, in the case of long transmission paths, amplifiers, such as for instance fiber-optic amplifiers, or regenerative repeaters are often used at specific intervals.

In order to achieve a high transmission range, it is advantageous, moreover, for the optical signal to be coupled into the optical waveguide with high power. However, the power which can be fed into an optical waveguide is limited by the occurrence of non-linearities, such as for instance so-called four-wave mixing. Although the upper power limit, characterized by the occurrence of these non-linear disturbances, can be increased by reducing the power density of the optical waveguide, for instance by means of a larger diameter of the core glass, and the provision of dispersion avoiding accumulation of the nonlinear disturbances in the transmission band utilized, this increase is restricted by the fact that an excessively high dispersion brings about a linear expansion of the signals that are usually to be transmitted at a bit rate of 10 gbit/s per wavelength over a transmission path having a length of 60 to 80 km.

In the prior art, therefore, it is known to use fibers standardized according to ITU G 655, so-called "Non-Zero- Dispersion-Shifted fibers" (NZDS fiber), which, on account of their special configuration, have a dispersion of 2 ps/(nm·km) to 5 ps/(nm·km) in a transmission band with wavelengths around 1550 nm. What is disadvantageous in this case is an increased attenuation of 0.23 dB/km, for example, compared with more or less conventional monomode fibers, which generally have an attenuation of approximately 0.20 dB/km. The paper by Ten et al.: Viable dispersion management scheme with standard and NZDSF fibers for 10 Gb/s wdm systems, ECOC 20 to 24 September 1998, Madrid, furthermore discloses arranging sections with fibers of positive and negative dispersion alternately one after the other, in order thus to obtain on average the desired dispersion. However, the provision of an optical-waveguide cable configured in this way is associated with a comparatively high outlay and is unsatisfactory from an economic standpoint.

SUMMARY OF THE INVENTION

The invention is based on the object of providing an optical-waveguide cable with which dispersion that avoids non-linearities can be obtained in a simple manner in conjunction with a relatively low attenuation. Furthermore, the intention is to provide a method for transmitting optical signals in which such an optical-waveguide cable is employed.

What is proposed for achieving this object is an optical-waveguide cable, in particular for transmitting optical signals according to wavelength division multiplex technology, having at least one first section, which has fibers of a first type, and at least one second section, which has fibers of a second type, the fibers of the first type being connected to the fibers of the second type at at least one transition point between the first and second sections, and the fibers of the first type having a larger mode field diameter and a higher dispersion than the fibers of the second type.

An optical-waveguide cable designed in this way adopts the insight that undesirable non-linearities occur predominantly in a region of an optical waveguide which follows the transmitter or amplifier that feeds in the optical signal with high power. The reason for this is that a power loss occurs on account of the attenuation that unavoidably occurs in an optical waveguide, which power loss, after a certain transmission path, reduces the power of the signal fed in in such a way that the occurrence of non-linearities becomes negligible. Thus, for instance in the case of a relatively low attenuation of an optical waveguide of only 0.2 dB/cm, an attenuation of, in total, 3 dB to 6 dB already results after 15 to 30 km, and significantly reduces the power of the signal fed in.

In the case of the optical-waveguide cable according to the invention, the first section having fibers of a first type with a comparatively large mode field diameter and a relatively high dispersion provides a high-level fiber which prevents the occurrence of non-linearities in the region following a transmitter or amplifier, which region is characterized by a still comparatively high power of the signal fed in. By contrast, the second section of the fibers designed as low-level fiber—of a second type with a smaller, that is to say normal, mode field diameter and a smaller dispersion makes it possible for there to be a dispersion that is favorable with regard to a transmission of high bit rates starting from that point on the transmission path at which the non-linearities are negligible.

It is particularly advantageous to arrange the second section between two first sections. This is because a symmetrical arrangement of the form "high-level fiber/low-level fiber/high-level fiber" can be achieved in this way, which allows a high-power optical signal to be fed in from both ends of the optical-waveguide cable and is thus suitable for bidirectional operation. Thus, in contrast to the known embodiments, the optical-waveguide cable according to the invention is composed of only two strung-together sections in the case of unidirectional operation and only three strung-together sections in the case of bidirectional operation and is therefore comparatively inexpensive to produce.

With regard to the customary transmission methods, it is expedient if the fibers of the first type, which are designed as high-level fiber, have a mode field diameter of more than 8 $\mu$m at a wavelength of 1550 nm and the fibers of the second type, which are designed as low-level fiber, have a mode field diameter of more than 6 $\mu$m at a wavelength of 1550 nm. In order to avoid splice losses when connecting the fibers of the first type to the fibers of the second type at the transition point between the first and second sections, it has furthermore proved to be expedient if the mode field diameter of the fibers of the second type is less than 3 $\mu$m smaller than the mode field diameter of the fibers of the first type.

Moreover, it is advantageous with regard to a practical configuration if the dispersion of the fibers of the first type, which are designed as high-level fiber, is between 12 ps/(nm·km) and 22 ps/(nm·km) in a transmission band of 1525 nm to 1625 nm and the dispersion of the fibers of the second type, which are designed as low-level fiber, is between 0 ps/(nm·km) and 12 ps/(nm·kn) in a transmission band of 1525 nm to 1625 nm. It is advantageous, moreover, to provide a transition piece at the transition point between the fibers of the first type and the fibers of the second type, which transition piece gradually reduces the diameter of the core glass of the high-level fibers over a defined length of the optical-waveguide cable to the diameter of the core glass of the low-level fibers. Such a transition piece, which generally tapers conically in the direction of the smaller diameter, can be realized for example by a fusion splice, in which a gradual transition to the core diameter of the low-level fiber is achieved by pulling the end of the high-level fiber over a distance of generally more than 100 wavelengths.

In an advantageous development of the optical-waveguide cable according to the invention, the first and/or the second section are/is provided both with fibers of the first type and with fibers of the second type, in order to ensure a cable structure that is uniform and thus contributes to simple production. In this case, the fibers of the first type and the fibers of the second type are advantageously arranged in groups that are separated from one another, thereby making it possible to ensure unambiguous assignment and identification of high-level fibers and low-level fibers. For this purpose it is advantageous, moreover, if the fibers of the first type and the fibers of the second type are in each case designed as fiber bundles, fiber ribbons or bundle cores.

Moreover, for achieving the above object, a method for transmitting optical signals in particular according to wavelength division multiplex technology, is specified, in which the optical signals to be transmitted are coupled into fibers of a first type, which are provided in a first section of an optical-waveguide cable, and, after a specific transmission path, are conducted into fibers of a second type, which are provided in a second section of the optical-waveguide cable, the fibers of the first type being connected to the fibers of the second type at at least one transition point between the first and second sections, and the fibers of the first type having a larger mode field diameter and a higher dispersion than the fibers of the second type.

Such a method makes use of the above-described advantages of the optical-waveguide cable according to the invention in order to achieve dispersion that avoids non-linearities in a simple manner in conjunction with a relatively low attenuation of the optical-waveguide cable.

In a development of this method, it is furthermore proposed that after a specific transmission path through the fibers of the second type of the second section, the optical signals to be transmitted are conducted into fibers of the first type of a further first section, in order to enable bidirectional operation. Finally, it is proposed that the individual optical waveguides of the optical-waveguide cable be coupled by a so-called pigtail, a connecting fiber prefabricated with a connector, or a patch cable, a fully fabricated connecting cable with connector types configured for simplex or duplex technology, to a transmitter, a receiver or an amplifier provided between the transmitter and receiver. This affords the advantage that an optical-waveguide cable with first and second sections which have both fibers of the first type and fibers of the second type can also be connected with a comparatively low outlay.

BRIEF DESCRIPTION OF THE DRAWINGS

Details and further advantages of the subject-matter of the present invention emerge from the following description of two preferred exemplary embodiments. In the associated drawing, in detail.

DETAILED DESCRIPTION OF THE PREFERRED EMBODIMENTS

Figure 1A:
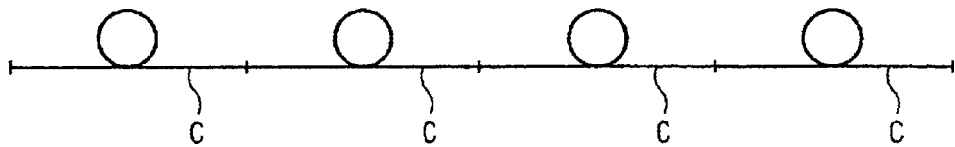
FIG. 1a illustrates a diagrammatic representation of a transmission path formed by a conventional optical-waveguide cable with, for example, monomode or NZDS fibers.
Figure 1B:
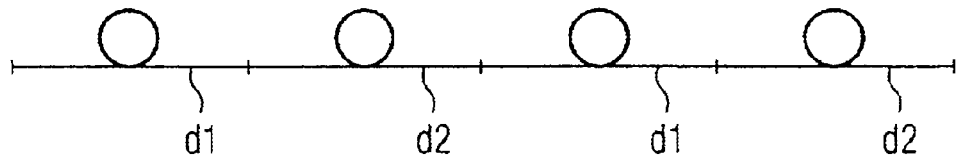
FIG. 1b illustrates a diagrammatic representation of a transmission path formed by a conventional optical-waveguide cable with alternate sections of fibers of positive and negative dispersion.

A conventional optical-waveguide cable is employed for the transmission path composed of sections c which is illustrated in FIG. 1a, which cable in each case comprises fibers of a single type, for example monomode fibers or NZDS fibers in the sections c. Primarily in the case of an optical signal which is coupled in with high power, such a transmission path is affected by the disadvantages described in the introduction, such as for instance the occurrence of non-linearities. Although the transmission path which is represented in FIG. 1b is formed from an optical-waveguide cable in which sections d1 having fibers of positive dispersion and sections d2 having fibers of negative dispersion alternate with one another, in order thus to obtain on average a dispersion that avoids non-linearities, such cable management is nonetheless characterized by complicated and economically unsatisfactory production of the optical-waveguide cable.

Figure 2A:
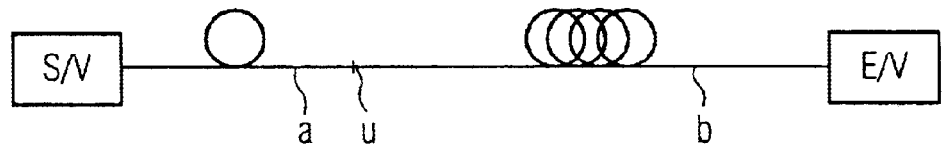
FIG. 2a illustrates a diagrammatic representation of a transmission path formed by an optical-waveguide cable of a first embodiment of the present invention.

In contrast to this, the transmission path which is shown in FIG. 2a comprises an optical-waveguide cable which is composed of a first section a and a second section b. The section a has fibers of a first type H, which are formed with a comparatively large mode field diameter and a comparatively high dispersion as high-level fibers. By contrast, the section b has fibers of a second type N, which, provided with a smaller mode field diameter and smaller dispersion, are formed as low-level fibers. At the transition point U between the section a and the section b, the fibers of the first type H are connected to the fibers of the second type N by a fusion splice. The fusion splice ensures a low splice loss with values of between 0.03 dB and 0.3 dB, for example.

The fibers of the first type H are designed in such a way that they have a mode field diameter of more than 8 $\mu$m at a wavelength of 1550 nm and the dispersion is between 12 ps/(nm·km) and 22 ps/(nm·km) in the transmission band of from 1525 nm to 1625 nm. In comparison with this, the fibers of the second type N have a mode field diameter of more than 6 $\mu$m at a wavelength of 1550 nm, the difference between the mode field diameter of the fibers of the first type H and the fibers of the second type N being less than 3 $\mu$m. The fibers of the second type N are furthermore configured in such a way that the dispersion has a magnitude of between 0 ps/(nm·km) and 12 ps/(nm·km) in the transmission band of from 1525 nm to 1625 nm.

If optical signals are coupled into the fibers H of the section a with high power by a transmitter S or an amplifier V, then the occurrence of non-linearities is effectively prevented on account of the comparatively large mode field diameter and the comparatively high dispersion of the fibers H designed as high-level fibers. On account of the unavoidable attenuation, however, the energy, that is to say the light power, of the optical signal is reduced in the course of the section a. After 10 to 20 km, the light power of the optical signal has decayed to such an extent that the probability of the occurrence of non-linearities becomes negligibly low. The optical signals are then conducted at the transition point U into the fibers N—designed as low-level fibers—of the generally significantly longer section b which reaches as far as the receiver E or as far as an intermediate repeater V. The smaller dispersion and the smaller mode field diameter of the fibers N which are then optimized for transmission at a specific bit rate result in a high degree of utilization of the bandwidth of the optical-waveguide cable.

Figure 2B:
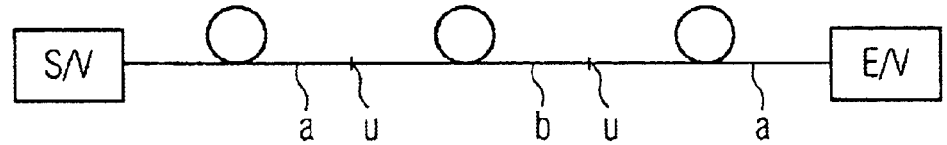
FIG. 2b illustrates a diagrammatic representation of a transmission path formed by an optical-waveguide cable of a second embodiment of the present invention.

The above-described arrangement of the optical-waveguide cable in accordance with FIG. 2a is only suitable for unidirectional operation, however, since coupling optical signals with high power into the fibers N—designed as low-level fibers—at the end of the section b does not lead to the advantages described above. An arrangement which is suitable for bidirectional operation is shown in FIG. 2b. In this embodiment of an optical-waveguide cable, a second section b is arranged between two first sections a, so that optical signals can be coupled in with high power from both ends of the optical-waveguide cable, without running the risk of non-linear disturbances occurring.

Figure 2C:
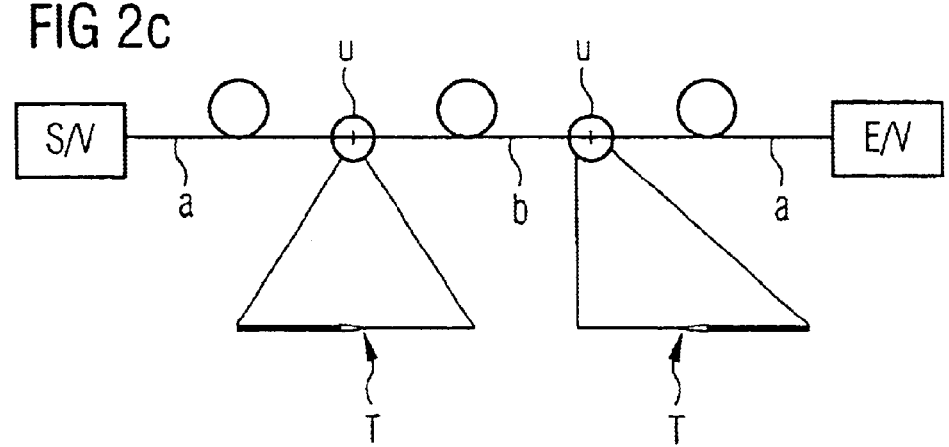
FIG. 2c illustrates a representation in accordance with FIG. 2b which shows a transition point between the sections of the optical-waveguide cable of the second embodiment in more detail.

FIG. 2c represents the transition point U between the section a and the section b in greater detail. A transition piece T can be discerned, which is provided between the fibers of the first type H and the fibers of the second type N. The transition piece T gradually reduces the diameter of the core glass of the fibers of the first type H over a length corresponding to the respective application, which length generally amounts to at least 100 wavelengths, to the core diameter of the fibers of the second type N. If, as already explained above, a fusion splice is used to weld the fibers H designed as high-level fibers to the fibers N designed as low-level fibers N, then a transition piece T which tapers conically in the direction of the smaller diameter can be formed by the end of the fibers H designed as high-level fiber being pulled lengthwise and thereby narrowed. The light beams within the core glass traverse a funnel-shaped bottleneck in this way.

Figure 3A:
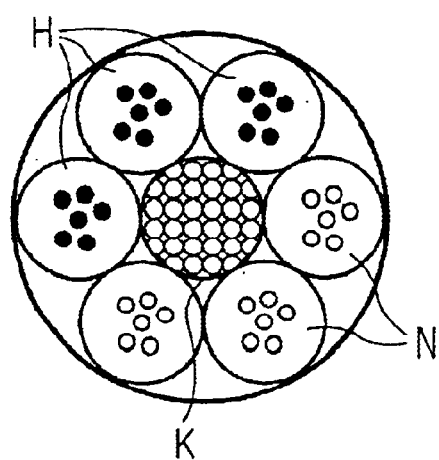
FIG. 3a illustrates a cross section through an optical-waveguide cable according to the invention with fibers grouped into bundle cores.
Figure 3B:
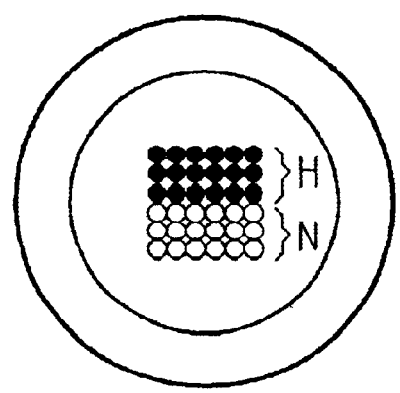
FIG. 3b shows a cross section through an optical-waveguide cable according to the invention with fibers grouped into fiber ribbons.

FIGS. 3a and 3b reveal that the optical-waveguide cable used in the arrangements in accordance with FIGS. 2a to 2c can be provided both with fibers of the first type H and with fibers of the second type N in the sections a and b. Such a uniform cable structure ensures simple and inexpensive production. In order, moreover, to ensure unambiguous assignment and identification of fibers H designed as high-level fiber and fibers N designed as low-level fibers, which contributes to practical assembly, the fibers H and the fibers N are arranged in groups that are separated from one another. FIG. 3a shows a grouping in which the fibers H, N designed as bundle cores are arranged around a cable core K. The cable core K, for instance a rod of glass-fiber reinforced plastic, serves for thermal and mechanical stabilization of the optical-waveguide cable. Such stranding affords the advantage, moreover, that an extension of the individual fibers H, N becomes largely independent relative to the extension of the entire optical-waveguide cable. By contrast, FIG. 3b shows a grouping in which the fibers of the first type H and the fibers of the second type N are in each case designed as fiber ribbons.

The optical-waveguide cable described above makes it possible to ensure a dispersion that avoids non-linearities in a simple manner in conjunction with a relatively low attenuation overall. The reason for this is primarily the provision of at least two sections a, b provided with high-level fibers H and low-level fibers N, respectively. In this case, it is also possible for the optical-waveguide cable to have a structure in which fibers H designed as high-level fibers and fibers N designed as low-level fibers are simultaneously present in the sections a, b. Depending on the application, such mixed sections can also be combined with uniform sections of a single fiber type. Last but not least, practical cabling is taken into account by the grouping of the fibers N, H in mixed sections.

List of Reference Symbols a First section
b Second section
c Section comprising monomode fibers or NZDS fibers
d1 Section comprising fibers with positive dispersion
d2 Section comprising fibers with negative dispersion
E Receiver
H High-level fiber
K Cable core
N Low-level fiber
S Transmitter
T Transition piece
U Transition point
V Amplifier

We claim:

1. An optical-waveguide cable for transmitting optical signals according to wavelength division multiplex technology, said cable comprising of at least one first section (a), which has fibers of a first type (H), and at least one second section (b), which has fibers of a second type (N), wherein the dispersion of the fibers of the second type (N) is between about 0 ps/(nm·km) and about 12 ps/(nm·km) in a transmission band of from about 1525 nm to about 1625 nm, the fibers of the first type (H) being connected to the fibers of the second type (N) at least one transition point (U) between the first and second sections (a,b), and the fibers of the first type (H) being designated in such a way that they have a larger mode field diameter and a higher dispersion than the fibers of the second type (N).

2. The optical-waveguide cable according to claim 1, wherein the second section (b) is arranged between two first sections (a).

3. The optical-waveguide cable according to claim 1, wherein the fibers of the first type (H) have a mode field diameter of more than 8 μm at a wavelength of 1550 nm.

4. The optical-waveguide cable according to claim 1, wherein the fibers of the second type (N) have a mode field diameter of more than 6 μm at a wavelength of 1550 nm.

5. The optical-waveguide cable according to claim 1, wherein the mode field diameter of the fibers of the second type (N) is less than 3 μm smaller than the mode field diameter of the fibers of the first type (H).

6. The optical-waveguide cable according to claim 1, wherein the fibers of the first type (H) have a mode field diameter of more than 8 μm at a wavelength of 1550 nm, the fibers of the second type (N) have a mode field diameter of more than 6 μm at a wavelength of 1550 nm, and the mode field diameter of the fibers of the second type (N) is less than 3 μm smaller than the mode field diameter of the fibers of the first type (H).

7. The optical-waveguide cable according to claim 1, wherein the dispersion of the fibers of the first type (H) is between 12 ps/(nm·km) and 22 ps/(nm·km) in a transmission band of from about 1525 nm to about 1625 nm.

8. The optical-waveguide cable according to claim 1, wherein a transition piece (T) is provided at the transition point (U) between fibers of the first type (H) and fibers of the second type (N), the transition piece (T) gradually reduces the core diameter of the fibers of the first type (H) over a predetermined length to the core diameter of the fibers of the second type (N).

9. The optical-waveguide cable according to claim 1, wherein the first and/or second section (a,b) are/as provided both with fibers of the first type (H) and with fibers of the second type (N).

10. The optical-waveguide cable according to claim 1, wherein the fibers of the first type (H) and the fibers of the second type (N) are arranged in groups that are separated from one another.

11. The optical-waveguide cable according to claim 8, wherein the fibers of the first type (H) and the fibers of the second type (N) are in each case designated as fiber bundles, fiber ribbons or bundle cores.

12. A method for transmitting optical signals according to wavelength division multiplex technology, in which method the optical signals to be transmitted are coupled into fibers of a first type (H), which are provided in a first section (a) of an optical-waveguide cable, and, after a specific transmission path, are conducted into fibers of a second type (N), which are provided in a second section (b) of the optical-waveguide cable, wherein the dispersion of the fibers of the second type (N) is between 0 ps/(nm·km) and 12 ps/(nm·km) in a transmission band of from about 1525 nm to about 1625 nm, the fibers of the first type (H) being connected to the fibers of the second type (N) at least one transition point (U) between the first and second sections (a,b), and the fibers of the first type (H) having a larger mode field diameter and a higher dispersion than the fibers of the second type (N).

13. The method according to claim 12, wherein, after a specific transmission path through the fibers of the second type (N) of the second section (b), the optical signals to be transmitted are conducted into fibers of the first type (H) of a further first section (a).

14. The method according to claim 12, wherein at least one fiber of the optical-waveguide cable is coupled by a pigtail or a patch cable to a transmitter (S), a receiver (E), or an amplifier (V) provided between the transmitter (S) and the receiver (E).

* * * * *